United States Patent
Elsner et al.

(10) Patent No.: US 6,485,607 B1
(45) Date of Patent: Nov. 26, 2002

(54) METHODS FOR REMOVING VOLATILE COMPONENTS FROM POLYMER SOLUTIONS

(75) Inventors: Thomas Elsner, Düsseldorf (DE); Jürgen Heuser, Krefeld (DE); Christian Kords, Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/673,227

(22) PCT Filed: Apr. 8, 1999

(86) PCT No.: PCT/EP99/02387

§ 371 (c)(1), (2), (4) Date: Oct. 13, 2000

(87) PCT Pub. No.: WO99/54381

PCT Pub. Date: Oct. 28, 1999

(30) Foreign Application Priority Data

Apr. 21, 1998 (DE) .......................................... 198 17 677

(51) Int. Cl.$^7$ .............................. B01D 1/30; B01D 3/06; C08F 6/00; C08G 64/40
(52) U.S. Cl. ........................... 159/2.1; 159/2.3; 159/23; 159/47.1; 159/DIG. 8; 159/DIG. 15; 528/490; 528/501
(58) Field of Search ................................. 159/47.1, 2.1, 159/DIG. 10, 23, DIG. 15, DIG. 8; 203/86, 88, 71; 202/267.1, 235; 528/490, 501

(56) References Cited

U.S. PATENT DOCUMENTS

| 2,941,985 | A | * | 6/1960 | Amos et al. ................. 528/501 |
| 3,453,184 | A | * | 7/1969 | Gemassmer et al. .......... 203/88 |
| 4,153,501 | A | | 5/1979 | Fink et al. ..................... 159/49 |
| 4,808,262 | A | | 2/1989 | Aneja et al. ................ 159/47.1 |
| 5,084,134 | A | | 1/1992 | Mattiussi et al. .......... 159/47.1 |
| 5,416,186 | A | | 5/1995 | Oshino et al. .............. 528/198 |
| 5,498,688 | A | * | 3/1996 | Oshino et al. .............. 528/198 |

FOREIGN PATENT DOCUMENTS

| EP | 0 150 225 | 12/1987 |
| EP | 0 723 029 | 7/1996 |
| JP | 4088017 | 3/1992 |
| NL | 7701223 | 8/1978 |

* cited by examiner

*Primary Examiner*—Virginia Manoharan
(74) *Attorney, Agent, or Firm*—Joseph C. Gil; James R. Franks; Aron Preis

(57) ABSTRACT

A method for removing volatile components from polymer solutions is disclosed. The method, yielding products having low content of residual volatile components and causing no thermal damage to the polymer, entails using apparatuses in which surfaces which come into contact with the product are made from materials which are low in iron content.

4 Claims, No Drawings

METHODS FOR REMOVING VOLATILE COMPONENTS FROM POLYMER SOLUTIONS

CROSS REFERENCE TO RELATED PATENT APPLICATIONS

The present patent application claims the right of priority under 35 U.S.C. 119 and 35 U.S.C. 365 of International Application No. PCT/EP99/02387, filed Apr. 8, 1999, which was published in German as International Patent Publication No. WO 99/54381 on Oct. 28, 1999, which is entitled to the right of priority of German Patent Application No. 198 17 677.5, filed Apr. 21 1998.

The present invention relates to processes for removing volatile components from polymer solutions, which result in products with a low residual content of volatile components without thermal degradation of the polymer.

BACKGROUND OF THE INVENTION

The removal of volatile components from a polymer solution is one of the final process stages in the production of many polymers. The volatile constituents to be removed may either be solvents and/or unpolymerised monomers. Depending on the order of magnitude of the viscosity of the polymer solution, various processes are known for removing volatile components from the polymer solution, in each of which processes the polymer solution is heated above the evaporation temperature of the volatile constituents. Examples of apparatuses which are known include thin film evaporators, extruders, and those comprising indirect heat exchange. It is crucial that the polymer is not degraded during the heating of the polymer solution.

U.S. Pat. No. 4,153,501 describes a method and an apparatus for removing volatile constituents from a polymer melt by heating it in a heat exchanger which contains vertically disposed channels which release their pressure directly into the bottom of a separator, where evaporation of the volatile components takes place. The channels have thicknesses of 0.5–4 mm. The temperature difference between the polymer solution and the heating medium is less than 50° C., and the cooling of the polymer solution due to the components which evaporate is less than 30° C. A residual content of volatile components in the polymer of <0.1% by weight is claimed to be achieved.

EP-A 150 225 describes an apparatus which comprises two heat exchanger bundles connected in series. The heat exchanger bundles comprise rectangular channels. This apparatus is mainly used for two-stage heating or cooling during the reaction. but is a relatively costly apparatus.

EP-B 226 204 discloses a process and a heat exchanger for removing volatile constituents from a polymer solution containing at least 25% by weight polymer. The polymer solution is heated in an indirect heat exchange zone which consists of a multiplicity of channels. These channels have a substantially uniform surface to volume ratio of 0.158–1.97 mm$^{-1}$, a thickness of 1.27–12.7 mm, a width of 2.54–10.16 cm and a length of 1.27–30.48 cm. The polymer solution is heated in the channels, at a pressure of 2 to 200 bar, to a temperature above the evaporation temperature of the volatile components but below the boiling temperature of the polymer. The dwell time of the polymer solution in the channels is 5–120 seconds. After heating, the solution is conveyed into a chamber in which at least 25% of the volatile constituents are out-gassed from the solution. This process reduces thermal degradation because the period of time over which the polymer is exposed to high temperatures is kept as short as possible. However, this process has the disadvantage that the solvent is not completely removed. Moreover, polymer deposits are formed on the outer face of the heat exchanger bundle, which deposits carbonise and gradually spall off over the course of time, so that the product is contaminated.

EP-B 352 727 discloses a process for removing volatile constituents from a polymer solution, wherein the polymer solution is heated to a temperature above the evaporation temperature of the volatile components in a multiplicity of channels connected in parallel. The ratio of heat exchange surface to the product volume flow is >80 hours/m. The velocity of flow in the channels is <0.5 mm/sec and the dwell time of the polymer solution in the channels is 120–200 seconds. This process also has the disadvantage that the solvent is not completely removed. Moreover, polymer deposits are also formed here on the outer face of the heat exchanger bundle, which deposits carbonise and gradually spall off over the course of time, so that the product is contaminated.

SUMMARY OF THE INVENTION

The object of the present invention was to provide a process for removing volatile components from polymer solutions which results in products with a low residual content of volatile components without thermal degradation of the polymer.

This object has been achieved according to the invention by a two-stage process for removing volatile components from polymer solutions with a polymer content >60% by weight, wherein in a first stage the polymer solution is heated in an indirect heat exchanger, which comprises channels, to 150 to 400° C. at a pressure of 1.5 to 50 bar and is subsequently depressurised in the channels to a pressure of 3 to 200 mbar, whereby the flow in the channels becomes two-phase at least in part and the volatile components are at least partially separated from the polymers, and the polymer, which still contains residual volatile components, is freed from residual volatile components in a second stage at a pressure of 0.1 to 10 mbar and at a temperature of 200 to 450° C.

DETAILED DESCRIPTION OF THE INVENTION

In the first stage of the process according to the invention, the polymer is forced into the channels of the heat exchanger at a pressure of 1.5 to 50 bar abs., preferably 2 to 5 bar abs., flows through the channels and in the course of this procedure is heated to a temperature of 150 to 400° C., preferably 200 to 350° C. At the outlet of the channels, there is a prevailing pressure which is below the saturation pressure of the volatile components. This pressure is 30 to 200 mbar abs., preferably 30 to 100 mbar abs.

The dwell time of the polymer solution is preferably 2 to 120 seconds, most preferably 80 to 120 seconds, at a velocity of flow which is preferably 0.0001 to 0.1 mm/sec, most preferably 0.001 to 0.005 mm/sec. The ratio of the heat exchange surface of the channels to the volume flow of the polymer solution is preferably 5 to 75 hours/m, most preferably 15 to 50 hours/m.

A honeycomb evaporator is preferably used as the indirect heat exchanger the channels of which have a parabolic profile. The product stream in the channels is thereby depressurised, the consequence of which is that on flowing through the channels the product stream becomes two-phase in at least part of the channel and separation of the volatile components can be effected via the gas flow. In the first stage, the volatile components are preferably removed down to a residual content <0.5% by weight, and the product is then fed to the second stage.

In the second stage, the polymer is freed from residual volatile components at a pressure of 0.1 to 10 mbar abs., preferably 0.5 to 3 mbar abs., and at a temperature of 200 to 450° C., preferably 250 to 350° C. This residual degassing is assisted by the polymer being distributed in the apparatus so that a large mass transfer surface is formed and diffusion of the volatile components out of the polymer is thereby facilitated. This second stage is preferably carried out in a long-tube evaporator. In the long-tube evaporator, the polymer is forced through a perforated plate with a multiplicity of holes or via a manifold distributor which contains the requisite holes. A multiplicity of polymer strands is thereby produced. These slowly flow to the base of the apparatus and in the course of this procedure release the volatile constituents which are still present.

It has also been found that products with particularly bright colours can be obtained if the removal of volatile components from polymer solutions is effected in apparatuses in which the surfaces which come into contact with the product are made from materials which are low in iron. By means of this measure, the quality of the products obtained in prior art processes for removing volatile components from polymer solutions can also be improved.

Another aspect of the invention therefore relates to a process for removing volatile components from polymer solutions at temperatures above the boiling points of the volatile components and below the boiling or decomposition temperature of the polymer, characterised in that all the surfaces of the apparatus by means of which the process is carried out which come into contact with the polymer solution, with the polymer or with the volatile components consist of a material which contains less than 10% by weight iron. In this respect, it is of course possible to fabricate all parts of the apparatus which come into contact with the product from said low-iron material. However, the apparatuses preferably comprise only one low-iron surface. e.g. a coating of low-iron material, and underneath that are fabricated from conventional iron or steel.

Examples of low-iron materials in the sense of the present invention include alloy 59 (2.4605), inconel 686 (2.4606), alloy B-2, alloy B-3, alloy B-4, hastelloy C-22, hastelloy C-276, hastelloy C-4 or tantalum. Alloy 59 is preferably used.

The process according to the invention can be used for removing volatile components from solutions of thermoplastic polymers, elastomers, silicone polymers, lubricants of high molecular weight, and similar substances. However, it is preferably employed for solutions of thermoplastic polymers, for example polystyrene, polyphenylene, polyurethane, polyamide, polyester, polyacrylate, polymethacrylate and copolymers thereof. The process according to the invention is particularly for removing volatile components from polycarbonate solutions.

EXAMPLES

Example 1

A solution containing 75% by weight polycarbonate, 24% by weight chlorobenzene and 1% by weight methylene chloride was forced into the channels of a heat exchanger at a pressure of 3 bar: abs. and was heated to 300° C. there. The heat exchanger had 100 channels with a length of 330 mm, which had a diameter of 16 mm at the inlet, and which widened at first linearly to a diameter of 34 mm over a length of 200 mm and which subsequently widened parabolically to 104 mm at the outlet. The pressure downstream of the channels was 40 mbar abs. The dwell time of the polycarbonate solution in the channels was 100 seconds. The polycarbonate was collected at the base of the heat exchanger; its chlorobenzene content was 1500 ppm. The polycarbonate solution was then pumped into a long-tube evaporator, distributed over the perforated base thereof, and was forced at a pressure of 40 bar abs. through 1000 holes of diameter 1 mm, so that a multiplicity of strands 6 m long was formed. At a pressure of 1 mbar abs. and a temperature of 300° C. the residual concentration of solvent in the polycarbonate was reduced to 20 ppm chlorobenzene. All parts of the installation which came into contact with the product were fabricated from alloy 59. The degassed polycarbonate had a Yellowness Index (YI, measured according to ASTM D 1925) of 2.3.

Example 2

This test was performed analogously to example 1, except that the parts of the installation which came into contact with the product were fabricated from high-iron steel (1.4571). The same residual content of solvent was achieved as in Example 1, but the polycarbonate which was obtained had a YI>10.

What is claimed is:

1. A two-stage process for removing volatile components from a polymer solution having a polymer content >60% by weight, said process comprising:
   (a)
      (i) heating, in a first stage, the polymer solution in an indirect heat exchanger, which comprises channels, to a temperature of 150 to 400° C. at a pressure of 1.5 to 50 bar, and
      (ii) depressurizing subsequently, the polymer solution in the channels of said indirect heat exchanger to a pressure of 3 to 200 mbar, thereby causing the flow in the channels to become two-phase at least in part, and the volatile components to be partially separated from the polymer; and
   (b) freeing, in a second stage apparatus, residual volatile components from the polymer of said first stage at a pressure of 0.1 to 10 mbar and at a temperature of 200 to 450° C.,
wherein the surfaces of said indirect heat exchanger and the surfaces of said second stage apparatus,
   that come into contact with at least one of
      the polymer solution,
      the polymer, and
      the volatile components,
each consist of a material which contains less than 10% by weight iron.

2. The process of claim 1, wherein the indirect heat exchanger is a honeycomb evaporator, and the channels of the honeycomb evaporator have a parabolic profile.

3. The process of claim 1, wherein the residual content of volatile components after the first stage is <0.5% by weight.

4. The process of claim 2 wherein the second stage apparatus is a long-tube evaporator.

* * * * *